(12) United States Patent
Uchida

(10) Patent No.: US 10,217,993 B2
(45) Date of Patent: Feb. 26, 2019

(54) METHOD OF MANUFACTURING NON-AQUEOUS ELECTROLYTE SECONDARY BATTERY

(71) Applicant: TOYOTA JIDOSHA KABUSHIKI KAISHA, Toyota-shi, Aichi (JP)

(72) Inventor: Yozo Uchida, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 497 days.

(21) Appl. No.: 15/021,834

(22) PCT Filed: Sep. 3, 2014

(86) PCT No.: PCT/JP2014/004526
§ 371 (c)(1),
(2) Date: Mar. 14, 2016

(87) PCT Pub. No.: WO2015/040810
PCT Pub. Date: Mar. 26, 2015

(65) Prior Publication Data
US 2016/0226060 A1 Aug. 4, 2016

(30) Foreign Application Priority Data
Sep. 18, 2013 (JP) .................................. 2013-193303

(51) Int. Cl.
*H01M 4/1393* (2010.01)
*H01M 4/04* (2006.01)
(Continued)

(52) U.S. Cl.
CPC ......... *H01M 4/1393* (2013.01); *H01M 4/043* (2013.01); *H01M 4/0404* (2013.01);
(Continued)

(58) Field of Classification Search
None
See application file for complete search history.

(56) References Cited

U.S. PATENT DOCUMENTS

2004/0072076 A1 4/2004 Matsubara et al.
2005/0241137 A1 11/2005 Suzuki et al.
(Continued)

FOREIGN PATENT DOCUMENTS

CN 100355118 C 12/2007
EP 0 776 056 A1 5/1997
(Continued)

OTHER PUBLICATIONS

International Search Report of PCT/JP2014/004526 dated Dec. 8, 2014 [PCT/ISA/210].
(Continued)

*Primary Examiner* — Sarah A. Slifka
(74) *Attorney, Agent, or Firm* — Sughrue Mion, PLLC

(57) ABSTRACT

A method of manufacturing a non-aqueous electrolyte secondary battery proposed herein includes a first binder supplying step (101), an active material supplying step (102), a second binder supplying step (103), and a pressing step (105). The first binder supplying step (101) is a step of applying a binder solution (122) to a current collector foil (121). The active material supplying step (102) is a step of supplying active material particles (123) onto the current collector foil (121) coated with the binder solution (122). The second binder supplying step (103) is a step of supplying the binder solution (122) onto the active material particles (123). The pressing step (105) is a step of pressing a layer of the active material particles (123) on the current collector foil (121).

10 Claims, 7 Drawing Sheets

(51) Int. Cl.
    *H01M 4/13*      (2010.01)
    *H01M 4/133*     (2010.01)
    *H01M 4/139*     (2010.01)
    *H01M 4/587*     (2010.01)
    *H01M 4/62*      (2006.01)
    *H01M 4/66*      (2006.01)
    *H01M 10/0525*   (2010.01)

(52) U.S. Cl.
    CPC ........... *H01M 4/0471* (2013.01); *H01M 4/13* (2013.01); *H01M 4/133* (2013.01); *H01M 4/139* (2013.01); *H01M 4/587* (2013.01); *H01M 4/622* (2013.01); *H01M 4/661* (2013.01); *H01M 10/0525* (2013.01); *H01M 4/0435* (2013.01)

(56) References Cited

U.S. PATENT DOCUMENTS

2011/0165467 A1   7/2011   Yew et al.
2012/0107682 A1   5/2012   Imachi et al.
2012/0115027 A1   5/2012   Uchida et al.
2014/0079872 A1   3/2014   Uchida et al.

FOREIGN PATENT DOCUMENTS

| | | |
|---|---|---|
| EP | 2 330 663 A1 | 6/2011 |
| JP | 2003-197189 A | 7/2003 |
| JP | 2003-317707 A | 11/2003 |
| JP | 2005-340188 A | 12/2005 |
| JP | 2011049231 A | 3/2011 |
| JP | 2013-012327 A | 1/2013 |
| JP | 2013065478 A | 4/2013 |
| JP | 2013134897 A | 7/2013 |
| JP | 2014-032935 A | 2/2014 |
| JP | 2014-078497 A | 5/2014 |
| WO | 2011/013413 A1 | 2/2011 |
| WO | 2012/053346 A1 | 4/2012 |

OTHER PUBLICATIONS

Written Opinion of PCT/JP2014/004526 dated Dec. 8, 2014 [PCT/ISA/237].

[Fig. 1]
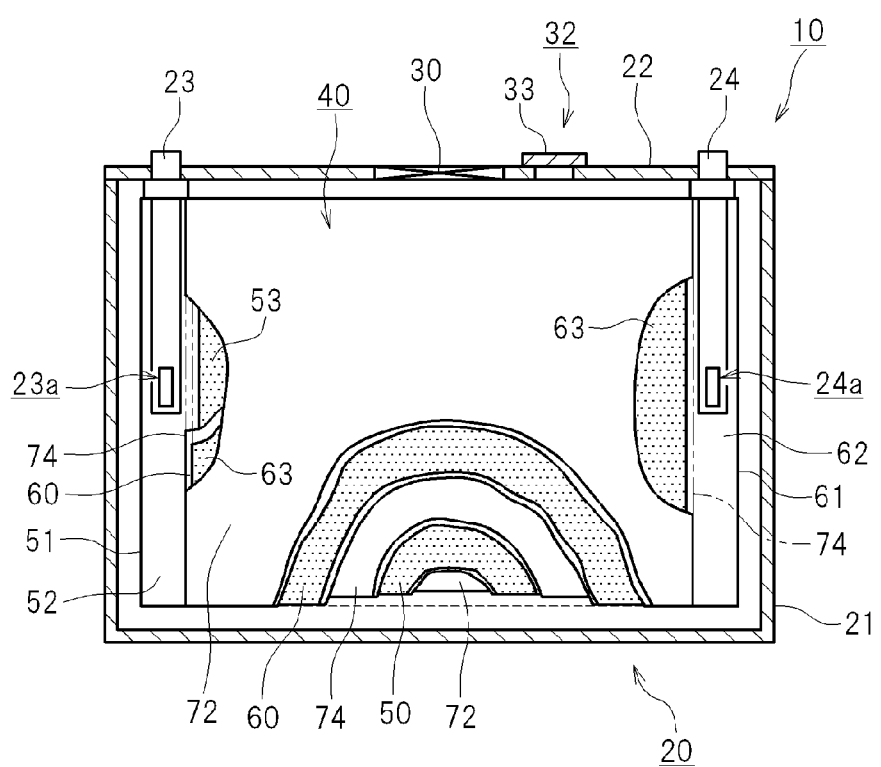

[Fig. 2]
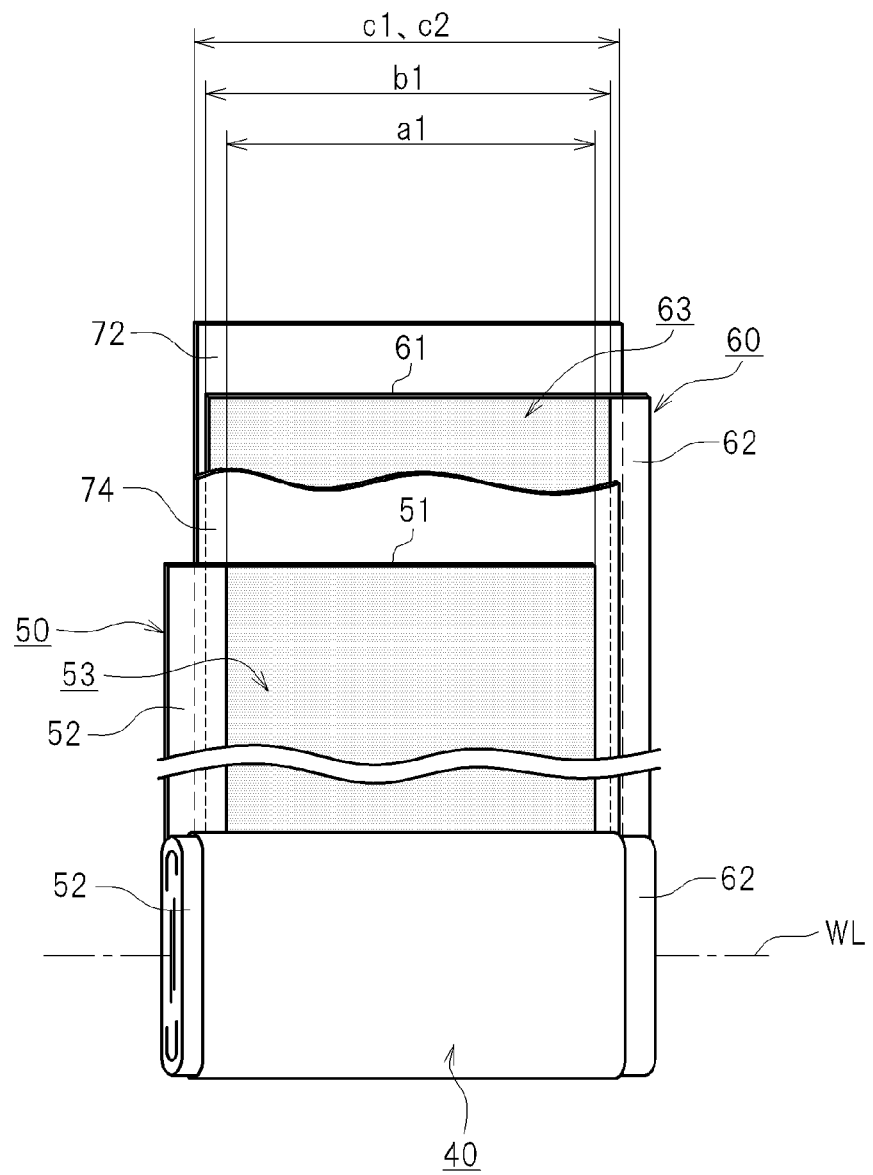

[Fig. 3]
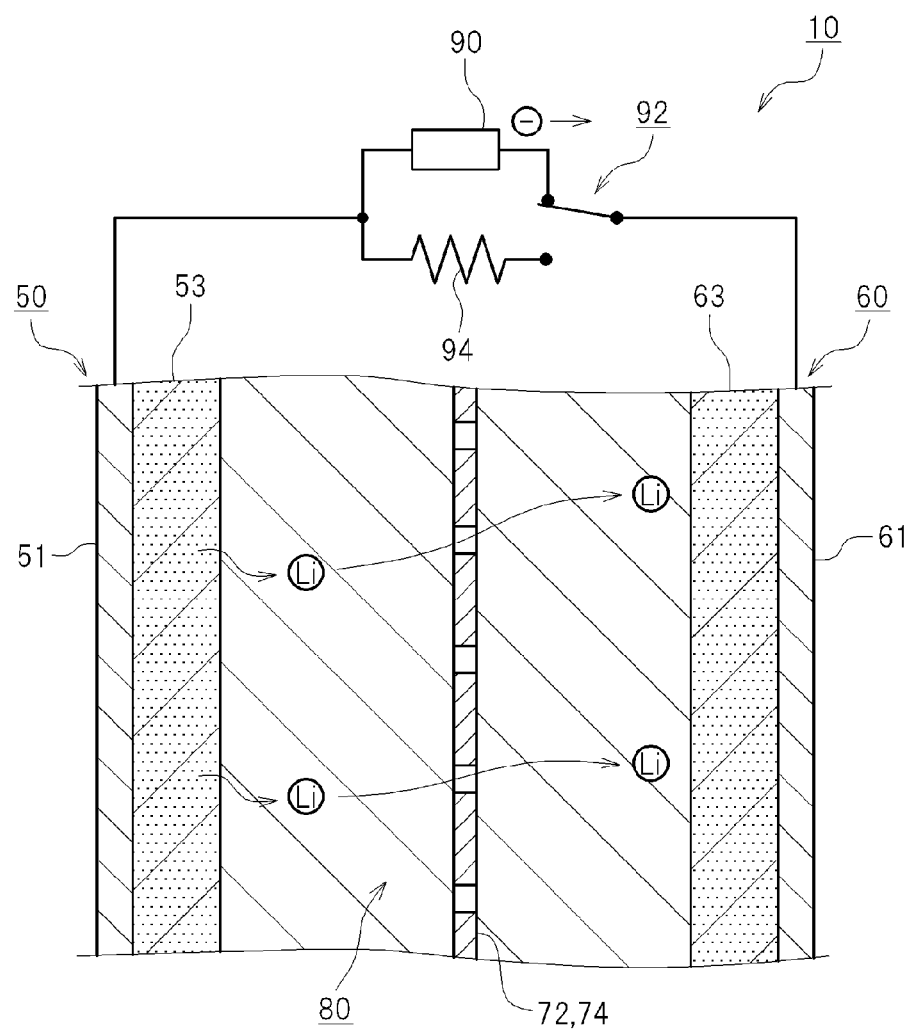

[Fig. 4]
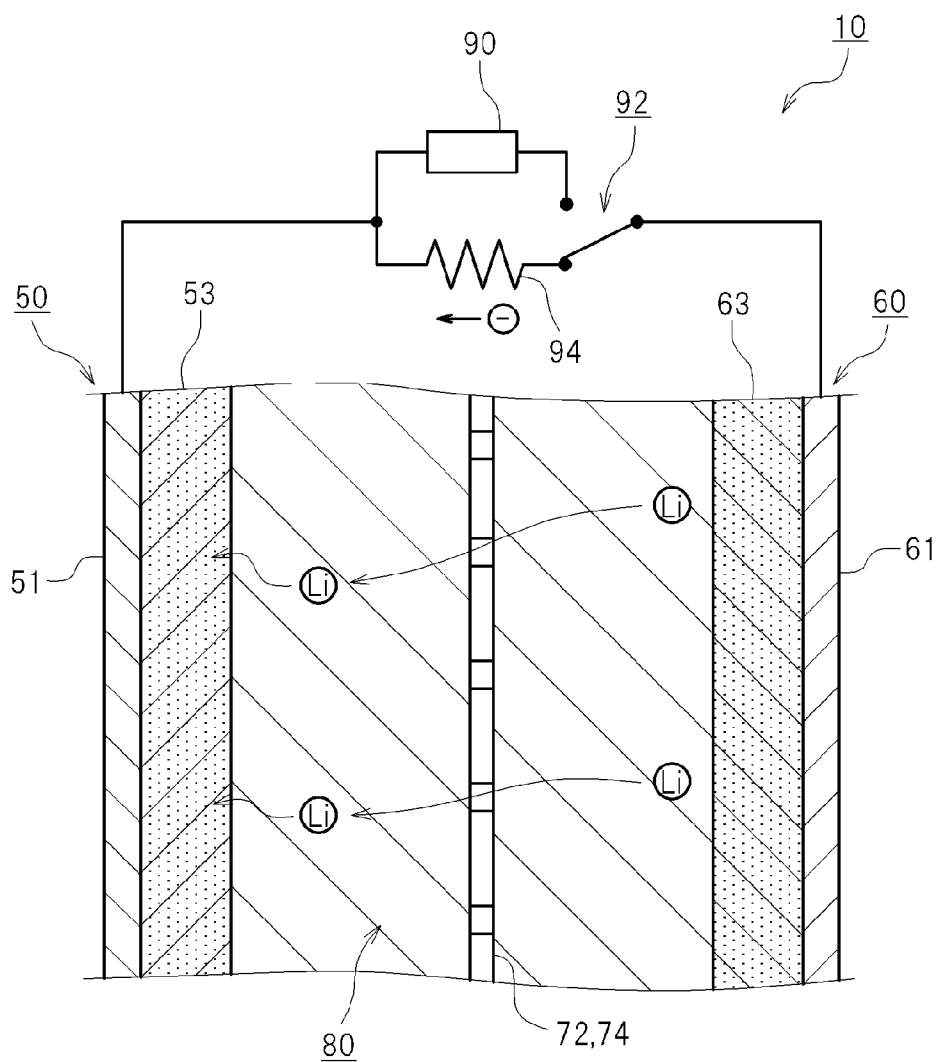

[Fig. 5]
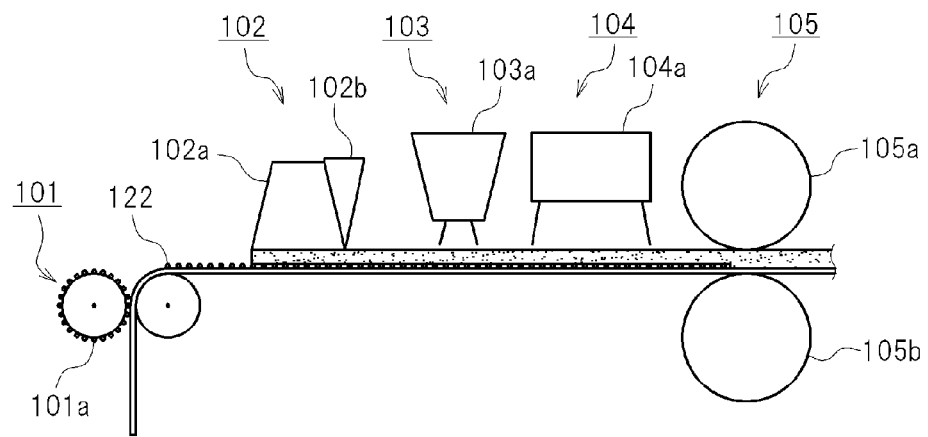
[Fig. 6]
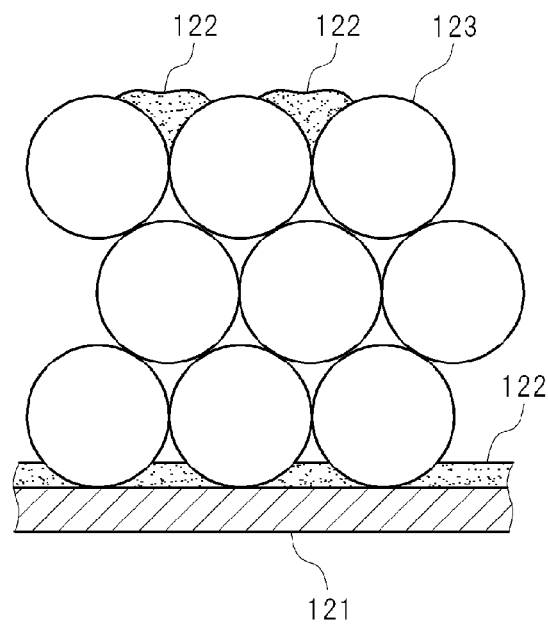

[Fig. 7]
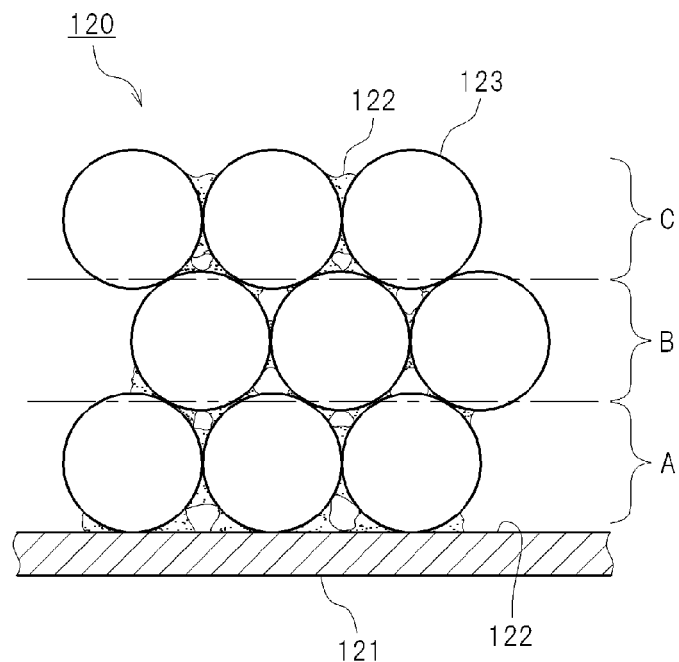
[Fig. 8]
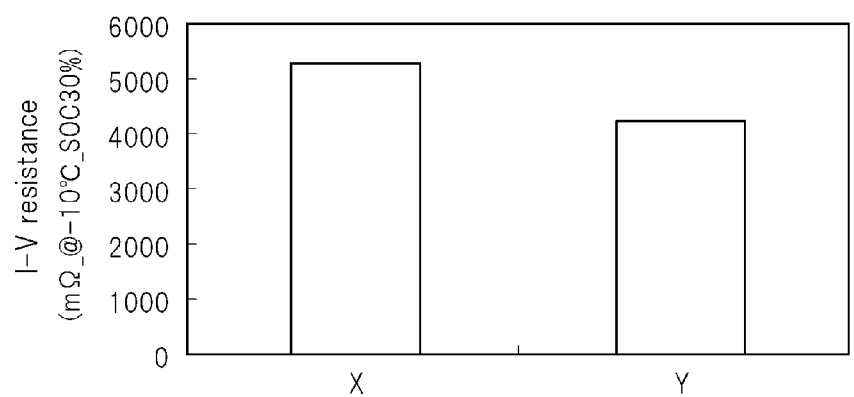

[Fig. 9]
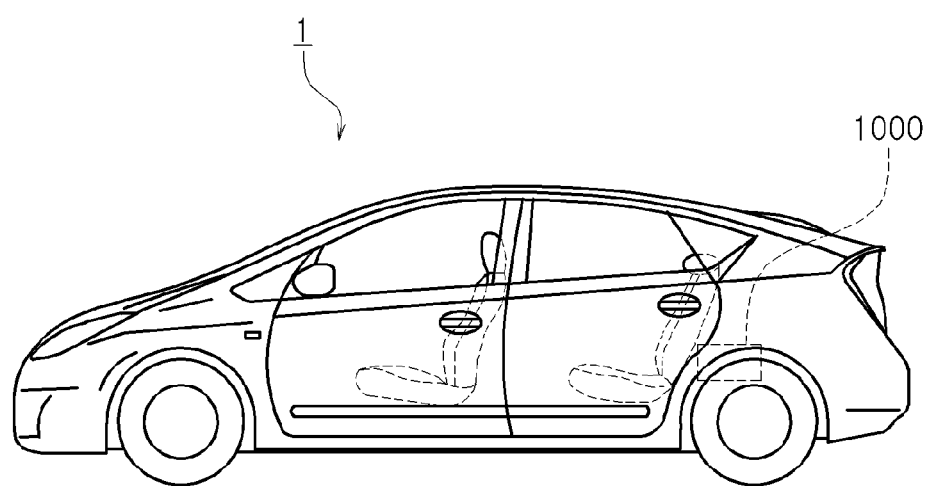

METHOD OF MANUFACTURING NON-AQUEOUS ELECTROLYTE SECONDARY BATTERY

CROSS REFERENCE TO RELATED APPLICATIONS

This application is a National Stage of International Application No. PCT/JP2014/004526, filed Sep. 3, 2014, claiming priority based on Japanese Patent Application No. 2013-193303, filed Sep. 18, 2013, the contents of all of which are incorporated herein by reference in their entirety.

TECHNICAL FIELD

The present invention relates to a method of manufacturing a non-aqueous electrolyte secondary battery.

In the present description, the term "secondary battery" refers to a repeatedly rechargeable battery in general. The term "non-aqueous electrolyte secondary battery" refers to a secondary battery that uses a non-aqueous electrolyte comprising a non-aqueous solvent in which an electrolyte salt is dissolved. The term "lithium-ion secondary battery," which is one type of the "non-aqueous electrolyte secondary battery," refers to a secondary battery that uses lithium ions as the electrolyte ions and implements charging and discharging by the transfer of electric charge which is associated with the transfer of the lithium ions between the positive and negative electrodes. The battery generally referred to as "lithium secondary battery" (such as lithium-ion polymer secondary battery) may be encompassed by the lithium-ion secondary battery in the present description.

BACKGROUND ART

A non-aqueous electrolyte secondary battery has an electrode sheet in which a layer of active material particles is formed on a foil-type current collector, for example. Such an electrode sheet is prepared, for example, in the following manner. A paste-type mixture is prepared by mixing active material particles, a binder, and a thickening agent together at a predetermined ratio. The resultant mixture is coated on a current collector, and then dried. Thereafter, the coated current collector is pressed. (See, for example, JP 2013-012327 A, Comparative Examples 1 and 2.)

JP 2013-012327 A also discloses a method of manufacturing an electrode sheet that can improve productivity and also increase the bonding strength between the current collector and a layer of active material particles. The method of manufacturing an electrode sheet disclosed therein includes coating a binder solution on a current collector, supplying and depositing a powder component containing at least a binder and an active material onto the current collector coated with the binder solution, and pressing the deposited layer in the thickness direction while heating it. This manufacturing method does not require a drying step and therefore improves productivity. Moreover, the binder is allowed to remain in a greater amount in a region of the layer of the active material particles that is near the current collector of the electrode sheet. This makes it possible to increase the bonding strength between the current collector and the layer of the active material particles.

CITATION LIST

Patent Literature

PTL 1: Patent Literature 1: JP 2013-012327 A

SUMMARY OF INVENTION

Technical Problem

In order to improve production efficiency and battery performance, the present inventor proposes a novel manufacturing method involving a step of manufacturing an electrode sheet having a layer of active material particles formed on a current collector.

Solution to Problem

The invention proposes a method of manufacturing a non-aqueous electrolyte secondary battery, including: applying a binder solution to a current collector foil (first binder supplying step); supplying active material particles onto the current collector foil to which the binder solution has been applied (active material supplying step); supplying the binder solution onto the active material particles (second binder supplying step); and pressing a layer of the active material particles on the current collector foil (pressing step).

In the method proposed herein, the layer of the active material particles contains no additive agent, such as a thickening agent, that is required for preparing a mixture paste. This makes it possible to obtain an electrode with lower resistance and also to provide a non-aqueous electrolyte secondary battery with lower resistance, compared to the cases that the layer of the active material particles is prepared by applying a mixture paste. Moreover, since the need for preparing the mixture paste is eliminated, the time required for the manufacture can be shortened, and the manufacturing cost can be further lowered.

It is possible that in the first binder supplying step, the binder solution may be supplied onto a surface of the current collector foil by gravure printing or ink-jet printing, for example. It is also possible that the binder solution may be an aqueous solution. It is also possible that a binder contained in the binder solution may be an SBR. It is also possible that the current collector foil may be a copper foil, and the active material particles may be graphite particles. In this case, the graphite particles may comprise spheroidal graphite. It is also possible that the method may further comprise a drying step of drying the current collector foil after the second binder supplying step and before the pressing step. In this case, the drying step may comprise applying infrared rays to the current collector foil on which the binder solution and the active material particles have been supplied.

An electrode sheet proposed herein includes a current collector foil and a layer disposed on the current collector foil and comprising active material particles and a binder. The active material particles are bonded to each other and to the current collector foil by the binder. The layer contains no thickening agent. That is, it is possible to provide an electrode sheet in which the layer of active material particles contains no thickening agent. Such an electrode sheet shows low resistance because it contains no thickening agent.

Herein, it is also possible that in the electrode sheet, the layer includes a ⅓ thickness region from the current collector foil and a middle ⅓ thickness region, and the ⅓ thickness region from the current collector foil contains the binder in an amount at least 20% by volume greater than the middle ⅓ thickness region. In this case, the bottom portion of the layer of active material particles, i.e., the boundary portion between the current collector foil and the layer of active material particles, contains the binder in a greater amount, which results in higher bonding strength between the current collector foil and the layer of active material particles. It is also possible that the layer further includes a ⅓ thickness region from a surface of the layer, and the layer contains the binder in an amount at least 20% greater than the middle ⅓ thickness region. This prevents the active material particles from being detached from the surface of the layer.

It is also possible to provide an electrode sheet in which the active material particles are graphite particles, the binder is an SBR, and the layer contains no CMC. Such an electrode sheet is suitable for, for example, a negative electrode sheet for a lithium-ion secondary battery.

BRIEF DESCRIPTION OF DRAWINGS

FIG. 1 is a partial cross-sectional view illustrating a lithium-ion secondary battery.

FIG. 2 is a view illustrating an electrode assembly incorporated in the lithium-ion secondary battery.

FIG. 3 is a schematic view illustrating a state of the lithium-ion secondary battery during charge.

FIG. 4 is a schematic view illustrating a state of the lithium-ion secondary battery during discharge.

FIG. 5 is a view illustrating a manufacturing process of an electrode sheet.

FIG. 6 is a partial cross-sectional view schematically illustrating the states of a binder solution and active material particles immediately after an active material supplying step and a second binder supplying step.

FIG. 7 is a partial cross-sectional view schematically illustrating the states of the binder and a layer of the active material particles after a drying step.

FIG. 8 is a graph comparing I-V resistance at a low temperature between a battery X (non-proposed battery) and a battery Y (proposed battery).

FIG. 9 is a view illustrating a vehicle incorporating a secondary battery (battery module).

DESCRIPTION OF EMBODIMENTS

The following description is given to illustrate an example of the embodiments of a method of manufacturing a non-aqueous electrolyte secondary battery proposed herein. The embodiments described herein are not intended to limit the present invention. The drawings are depicted schematically, and the dimensional relationship (length, width, thickness, and the like) in the drawings does not necessarily reflect actual dimensional relationship. The parts and components that exhibit the same effects are denoted by the same reference symbols, and repetitive description thereof may be omitted.

First, the outline of a lithium-ion secondary battery 10 will be described as an example of the structure of an applicable non-aqueous electrolyte secondary battery. Then, a method of manufacturing a non-aqueous electrolyte secondary battery proposed herein will be described.

<<Lithium-Ion Secondary Battery 10>>

FIG. 1 is a cross-sectional view illustrating a lithium-ion secondary battery 10. FIG. 2 is a view illustrating an electrode assembly 40 incorporated in the lithium-ion secondary battery 10. It should be noted that the lithium-ion secondary battery 10 depicted in FIGS. 1 and 2 merely illustrates an example of the lithium-ion secondary battery to which the present invention can be applied, and it does not particularly limit the lithium-ion secondary battery to which the present invention can be applied.

As illustrated in FIG. 1, the lithium-ion secondary battery 10 has a battery case 20 and an electrode assembly 40 (wound electrode assembly in FIG. 1).

<<Battery Case 20>>

The battery case 20 has a case main body 21 and a sealing plate 22. The case main body 21 has a box shape one end of which has an opening. The case main body 21 shown in FIG. 1 has a closed-bottom rectangular parallelepiped shape, and one face thereof is open, the one face corresponding to the upper face of the lithium-ion secondary battery 10 in the condition of normal use. In this embodiment, a rectangular opening is formed in the case main body 21. The sealing plate 22 is a member for closing the opening of the case main body 21. The sealing plate 22 comprises a substantially rectangular plate. The sealing plate 22 is welded to the peripheral edge of the opening of the case main body 21 to form the battery case 20 in a substantially hexahedral shape.

For the material of the battery case 20, it is preferable to use a lightweight and highly conductive metal material. Examples of such a metal material include aluminum, stainless steel, and nickel-plated steel. The battery case 20 (including the case main body 21 and the sealing plate 22) of the present embodiment is made of aluminum or an alloy mainly composed of aluminum.

In the example shown in FIG. 1, a positive electrode terminal 23 (external terminal) and a negative electrode terminal 24 (external terminal) are connected to the sealing plate 22. The sealing plate 22 has a safety vent 30 and a filling port 32. The safety vent 30 is so constructed that the internal pressure of the battery case 20 can be released when the internal pressure increases to a predetermined level or higher (for example, the designed valve opening pressure is from about 0.3 MPa to about 1.0 MPa). FIG. 1 illustrates the battery in which, after an electrolyte solution has been filled, the filling port 32 is sealed by a sealing material 33. The electrode assembly 40 is accommodated in the battery case 20 as described above.

<<Electrode Assembly 40 (Wound Electrode Assembly)>>

As illustrated in FIG. 2, the electrode assembly 40 has a strip-shaped positive electrode (positive electrode sheet 50), a strip-shaped negative electrode (negative electrode sheet 60), and strip-shaped separators (separators 72 and 74).

<<Positive Electrode Sheet 50>>

The positive electrode sheet 50 has a strip-shaped positive electrode current collector foil 51 and a positive electrode active material layer 53. For the positive electrode current collector foil 51, it is possible to use a metal foil suitable for use in the positive electrode, for example. For the positive electrode current collector foil 51, it is possible to use, for example, a strip-shaped aluminum foil having a predetermined width and a thickness of about 15 micrometer. An exposed portion 52 is provided along one lateral-side edge of the positive electrode current collector foil 51. In the example shown in the figure, the positive electrode active material layer 53 is formed on both faces of the positive electrode current collector foil 51 except for the exposed portion 52 provided in the positive electrode current collector foil 51. Herein, the "exposed portion 52" refers to a portion of the positive electrode current collector foil 51 in which the positive electrode active material layer 53 is not formed.

The positive electrode active material layer 53 is a layer of positive electrode active material particles disposed on the positive electrode current collector foil 51 and bonded together by a binder. For the positive electrode active material particles, it is possible to use any conventional substance used for lithium-ion secondary batteries, either alone or in combination, without any particular limitation. Preferable examples include: particles of an oxide containing lithium and one or more transition metal elements (i.e., lithium-transition metal oxide), such as lithium nickel oxide (for example, $LiNiO_2$), lithium cobalt oxide (for example, $LiCoO_2$), and lithium manganese oxide ($LiMn_2O_4$); and particles of a phosphate containing lithium and one or more transition metal elements, such as lithium manganese phosphate ($LiMnPO_4$) and lithium iron phosphate ($LiFePO_4$).

<<Conductive Agent>>

The positive electrode active material layer 53 may contain a conductive agent. Examples of the conductive agent include carbon materials, such as carbon powder and carbon fiber. It is possible to use one of the just-mentioned examples of the conductive agents either alone or in combination with another one or more of the examples. Examples of the carbon powder include various types of carbon blacks (such as acetylene black, oil-furnace black, graphitized carbon black, carbon black, graphite, and Ketjen Black) and graphite powder.

<<Negative Electrode Sheet 60>>

The negative electrode sheet 60 has a strip-shaped negative electrode current collector foil 61 and a negative electrode active material layer 63. For the negative electrode current collector foil 61, it is possible to use a metal foil suitable for use in the negative electrode, for example. For the negative electrode current collector foil 61, it is possible to use a strip-shaped copper foil having a predetermined width and a thickness of about 10 micrometer, for example. An exposed portion 62 is provided along one lateral-side edge of the negative electrode current collector foil 61. In the example shown in the figure, the negative electrode active material layer 63 is formed on both faces of the negative electrode current collector foil 61 except for the exposed portion 62 provided within the negative electrode current collector foil 61. Herein, the "exposed portion 62" refers to a portion of the negative electrode current collector foil 61 in which the negative electrode active material layer 63 is not formed.

The negative electrode active material layer 63 is a layer of negative electrode active material particles disposed on the positive electrode current collector foil 61 and bonded together by a binder. For the negative electrode active material particles, it is possible to use any conventional substance used for lithium-ion secondary batteries, either alone or in combination, without any particular limitation. For the negative electrode active material particles, it is possible to use any conventional substance used for lithium-ion secondary batteries, either alone or in combination, without any particular limitation. Preferable examples include: carbon-based materials, such as graphite particles, graphite carbons, and amorphous carbons; lithium transition metal oxides; and lithium transition metal nitrides.

<<Binder>>

In the positive electrode active material layer 53, the binder is a material for bonding the particles of the positive electrode active material and the conductive agent that are contained in the positive electrode active material layer 53 to each other and for bonding these particles to the positive electrode current collector foil 51. Likewise, in the negative electrode active material layer 63, the binder is a material for bonding the particles of the negative electrode active material and the conductive agent that are contained in the negative electrode active material layer 63 to each other and for bonding these particles to the negative electrode current collector foil 61.

The binder may be supplied in the form of binder solution. Herein, it is possible to use polymers that can be dissolved or dispersed in the solvent used. When an aqueous solvent is used, preferable examples of the binder include water-soluble or water-dispersible polymers such as: cellulose-based polymers (such as carboxymethyl-cellulose (CMC) and hydroxypropyl methyl cellulose (HPMC)); fluoropolymers (such as polyvinyl alcohol (PVA), polytetrafluoroethylene (PTFE), and tetrafluoroethylene-hexafluoropropylene copolymer (FEP)); and rubber materials (such as vinyl acetate copolymer, styrene-butadiene copolymer (SBR), acrylic acid-modified SBR resin (SBR latex)). When a non-aqueous solvent is used, it is preferable to use polymers (such as polyvinylidene fluoride (PVDF), polyvinylidene chloride (PVDC), and polyacrylonitrile (PAN)).

<<Separators 72 and 74>>

Each of the separators 72 and 74 is a member for separating the positive electrode sheet 50 and the negative electrode sheet 60 from each other, as illustrated in FIG. 2. In this example, each of the separators 72 and 74 is made of a strip-shaped sheet having a plurality of micropores and having a predetermined width. For the separators 72 and 74, it is possible to use, for example, either a single layer separator or a multi-layered separator, either of which comprises a porous resin film, for example, a film made of porous polyolefin-based resin. In this example, as illustrated in FIG. 2, the width b1 of the negative electrode active material layer 63 is slightly wider than the width a1 of the positive electrode active material layer 53. In addition, the respective widths c1 and c2 of the separators 72 and 74 are slightly wider than the width b1 of the negative electrode active material layer 63 (c1, c2>b1>a1).

Each of the separators 72 and 74 insulates the positive electrode sheet 53 and the negative electrode sheet 63 from each other, but permits the transfer of electrolyte. Although not shown in the drawings, each of the separators 72 and 74 may have a heat-resistant layer formed on the surface of a substrate made of a porous plastic film. The heat-resistant layer comprises a filler and a binder. The heat-resistant layer may also be referred to as HRL (heat resistance layer).

<<Fitting of Electrode Assembly 40>>

In this embodiment, the electrode assembly 40 is pressed and deformed into a flat shape along a plane containing the winding axis WL, as illustrated in FIG. 2. In the example shown in FIG. 2, the exposed portion 52 of the positive electrode current collector foil 51 and the exposed portion 62 of the negative electrode current collector foil 61 are exposed in a spiral shape from the opposite side edges of the separators 72 and 74. In this embodiment, as illustrated in FIG. 1, the intermediate portions of the exposed portions 52 and 62, which jut out from the separators 72 and 74, are gathered and welded respectively to the foremost end portions 23a and 24a of the positive and negative internal terminals 23 and 24.

As illustrated in FIG. 1, the electrode assembly 40 is enclosed in the battery case 20. An electrolyte solution is also filled into the battery case 20. The electrolyte solution infiltrates the inside of the electrode assembly 40 from the opposite axial ends of the winding axis WL (see FIG. 2).

<<Electrolyte Solution (Liquid Electrolyte)>>

As the electrolyte solution, the same type of non-aqueous electrolyte solution as used for conventional lithium-ion batteries may be used without any particular limitation. Such a non-aqueous electrolyte solution typically has a composition in which an appropriate non-aqueous solvent contains a supporting salt. Examples of the non-aqueous solvent include ethylene carbonate, propylene carbonate, dimethyl carbonate, diethyl carbonate, ethyl methyl carbonate, 1,2-dimethoxyethane, 1,2-diethoxyethane, tetrahydrofuran, and 1,3-dioxolane, either alone or in combination. Examples of the supporting salt include lithium salts such as $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$. One example of the non-aqueous electrolyte solution is a non-aqueous electrolyte solution in which $LiPF_6$ is contained at a concentration of about 1 mol/L in a mixed solvent of ethylene carbonate and diethyl carbonate (e.g., a mixed solvent with a mass ratio of about 1:1).

In the lithium-ion secondary battery 10, the positive electrode current collector foil 51 and the negative electrode current collector foil 61 are electrically connected to an external device via the electrode terminals 23 and 24, which penetrate through the battery case 20. The operation of the lithium-ion secondary battery 10 during charge and during discharge will be described in the following.

<<Operation During Charge>>

FIG. 3 schematically illustrates the state of the lithium-ion secondary battery 10 during charge. During charge, the electrode terminals 23 and 24 (see FIG. 1) of the lithium-ion secondary battery 10 are connected to a charger 90 by a switch 92, as illustrated in FIG. 3. The charger 90 applies a voltage between the positive electrode sheet 50 and the negative electrode sheet 60. Thereby lithium ions (Li) are released into the electrolyte solution 80 from the positive electrode active material in the positive electrode active material layer 53, and electric charge is discharged from the positive electrode active material layer 53. The discharged electric charge is transferred to the positive electrode current collector foil 51 and further transferred through the charger 90 to the negative electrode sheet 60. The electric charge is stored in the negative electrode sheet 60. Also, the lithium ions (Li) in the electrolyte solution 80 are absorbed and stored by the negative electrode active material in the negative electrode active material layer 63. As a result, a potential difference arises between the negative electrode sheet 60 and the positive electrode sheet 50.

<<Operation During Discharge>>

FIG. 4 schematically illustrates the state of the lithium-ion secondary battery 10 during discharge. During discharge, the lithium-ion secondary battery 10 is brought into such a state that the electrode terminals 23 and 24 (see FIG. 1) are connected to a resistor 94 by the switch 92, as illustrated in FIG. 4. During discharge, the potential difference between the negative electrode sheet 60 and the positive electrode sheet 50 allows electric charge to be transferred from the negative electrode sheet 60 to the positive electrode sheet 50. Also, the lithium ions stored in the negative electrode active material layer 63 are released into the electrolyte solution 80. In the positive electrode, the lithium ions in the electrolyte solution 80 are absorbed by the positive electrode active material in the positive electrode active material layer 53.

In this way, during charge and discharge of the lithium-ion secondary battery 10, lithium ions are absorbed and released between the positive electrode active material in the positive electrode active material layer 53 and the negative electrode active material in the negative electrode active material layer 63. Thus, lithium ions are transferred back and forth between the positive electrode active material layer 53 and the negative electrode active material layer 63 through the electrolyte solution 80.

<<Manufacturing Process of Electrode Sheet>>

FIG. 5 is a schematic view illustrating a manufacturing process of an electrode sheet. Referring to FIG. 5, a method of manufacturing a non-aqueous electrolyte secondary battery proposed herein includes a first binder supplying step 101, an active material supplying step 102, a second binder supplying step 103, a drying step 104, and a pressing step 105, for manufacturing an electrode sheet of the battery. The just-mentioned method of manufacturing an electrode sheet is applicable as a method of manufacturing the positive electrode sheet 50 or the negative electrode sheet 60 for the lithium-ion secondary battery 10 as described above.

<First Binder Supplying Step 101>

The first binder supplying step 101 is a step of applying a binder solution 122 to a current collector foil 121. The current collector foil 121 is an original sheet that forms the positive electrode current collector foil 51 or the negative electrode current collector foil 61. Herein, the current collector foil 121 is a strip-shaped sheet material, which is conveyed along a predetermined conveyance passage, not shown in the figure.

In the first binder supplying step 101 of the embodiment shown in FIG. 5, the binder solution 122 is applied onto the conveyed current collector foil 121 in a predetermined pattern through a gravure roller 101a. In this embodiment, the binder solution is transferred by gravure printing. Herein, it is desirable that the binder solution 122 have a required viscosity and a required permeability.

The binder solution 122 may be applied, for example, in stripes (in a striped pattern) that are engraved diagonally along the direction in which the current collector foil 121 is conveyed. For the gravure printing, various techniques such as direct gravure printing or micro-gravure printing may be used. In addition, the applying of the binder solution 122 in the first binder supplying step 101 may be achieved by various printing techniques such as gravure printing. For example, ink-jet printing may be used to apply the binder solution 122 to the current collector foil 121 in place of gravure printing.

<Active Material Supplying Step 102>

The active material supplying step 102 is a step of supplying active material particles 123 onto the current collector foil 121 to which the binder solution 122 has been applied. In this embodiment, the active material particles 123 are applied at a predetermined weight per unit area onto the current collector foil 121 to which the binder solution 122 has been applied. In the embodiment shown in FIG. 5, the active material particles 123 is sieved out from a hopper 102a, which stores powder of the active material particles 123 therein, through a sieve onto the current collector foil 121. Moreover, the weight per unit area of the active material particles 123 on the current collector foil 121 is adjusted through a gap adjusting mechanism 102b.

<Second Binder Supplying Step 103>

The second binder supplying step 103 is a step of supplying a binder solution 122 onto the active material particles 123. Here, the binder solution 122 is sprayed onto the active material particles 123, which have been supplied on the current collector foil in the active material supplying step 102, through a spray device 103a. The binder solution 122 to be sprayed in this step may be the same binder solution 122 used in the first binder supplying step 101. In this embodiment, it is desirable that the binder solution 122 to be applied should be an aqueous solution, for example, and it should have substantially the same level of viscosity and permeability as water. As the spray device 103a, it is possible to use a commercially available electrostatic spray device or a commercially available spray device, for example.

FIG. 6 schematically illustrates the states of the binder solution 122 and the active material particles 123 immediately after the active material supplying step 102 and the second binder supplying step 103. FIG. 7 schematically illustrates the states of the binder 122 and the layer of the active material particles 123 after the drying step 104.

In the first binder supplying step 101, a binder solution 122 is applied to the current collector foil 121. As illustrated in FIG. 6, in the active material supplying step 102, the active material particles 123 are supplied onto the current collector foil 121 to which the binder solution 122 has been applied. Further, in the second binder supplying step 103, the binder solution 122 is supplied onto the active material particles 123. As illustrated in FIG. 7, the supplied binder solution 122 permeates into the layer of the active material particles 123 by capillarity. In this embodiment, the binder solution 122 that is applied to the current collector foil 121 in the first binder supplying step 101 permeates into a bottom portion A of the layer of the active material particles 123. Thereafter, the binder solution 122 that is supplied (i.e., sprayed) to the layer of the active material particles 123 in the second binder supplying step 103 permeates into a surface portion C of the layer of the active material particles 123.

Thus, with this manufacturing method, the binder tends to go into narrow gaps by capillarity, so the binder easily goes into the gaps between the active material particles 123 and into the gaps between the active material particles 123 and the current collector foil 121. As a result, the binder 122 tends to be dispersed in the gaps between the active material particles 123 and in the gaps between the active material particles 123 and the current collector foil 121. For this reason, the active material particles 123 can be firmly bonded to each other and to the current collector foil 121 with a smaller amount of binder.

<Drying Step 104>

The drying step 104 is a step of drying the layer of the active material particles 123 formed on the current collector foil 121. The drying step 104 is carried out after the second binder supplying step 103 and before the pressing step 105. In this embodiment, a dryer device 104a used for the drying step 104 is an infrared irradiation device for applying infrared rays to the current collector foil 121 to which the binder solution 122 and the active material particles 123 have been supplied. The solvent component of the binder solution 122 that is impregnated in the layer of the active material particles 123 on the current collector foil 121 can be evaporated by applying infrared rays thereto. At this point, if the drying is performed by, for example, blowing hot air, there will be a risk of the layer of the active material particles 123 being blown off the current collector foil 121. On the other hand, when the drying is performed by applying infrared rays, there is no risk of the layer of the active material particles 123 being blown off.

<Pressing Step 105>

The pressing step 105 is a step of pressing the layer of the active material particles 123 formed on the current collector foil 121. The pressing step 105 is carried out after the drying step 104. In this embodiment, the pressing step 105 is performed by passing the current collector foil 121 between a pair of press rollers 105a and 105b, to press the layer of the active material particles 123. As a result, the spaces between the active material particles 123 become smaller, causing the active material particles 123 and the current collector foil 121 to be bonded reliably by the binder. Moreover, the drying step 104 is provided prior to the pressing step 105 in this embodiment. Therefore, the layer of the active material particles 123 having been formed on the current collector foil 121, which is to be supplied for the pressing step 105, is unlikely to stick to the press roller 105a because the surface thereof is dry. For the press rollers 105a and 105b, it is desirable to employ pressing rollers coated with polytetrafluoroethylene (PTFE), for example.

<<Layer of Active Material Particles 123>>

Thus, an electrode sheet 120 (see FIG. 7) can be obtained that has the current collector foil 121 and the layer of the active material particles 123 disposed on the current collector foil 121 and bonded together by a binder. For the electrode sheet obtained herein, no mixture paste is prepared when forming the layer of the active material particles 123. For this reason, the layer of the active material particles 123 contains no thickening agent, which has been necessary to obtain the viscosity required for the mixture paste.

For example, when forming the negative electrode active material layer 63 (see FIG. 2), a mixture paste is conventionally prepared by mixing negative electrode active material particles (for example, graphite particles), a binder (for example, SBR), and a thickening agent (for example, CMC) together with a paste solvent (for example, ion exchange water). The resultant mixture paste is applied onto the negative electrode current collector foil 61, then dried and pressed, to obtain the negative electrode mixture layer 63. In this case, the thickening agent (CMC) is necessary to maintain the mixture paste. Thus, the negative electrode active material layer 63 that is formed by applying a mixture paste inevitably contains a thickening agent (for example, CMC).

In contrast, the method of manufacturing an electrode sheet proposed herein does not use the mixture paste. This makes it possible to form a layer of the active material particles 123 that contains no thickening agent, as illustrated in FIG. 7. That is, the layer of the active material particles 123 that is formed according to the method of manufacturing an electrode sheet proposed herein contains the binder 122, but contains no thickening agent. Therefore, when the electrode sheet is incorporated in a non-aqueous electrolyte secondary battery as illustrated in FIG. 1, the contact area between the active material particles 123 and the electrolyte solution that is impregnated in the layer of the active material particles 123 is larger, and accordingly, the battery resistance becomes lower.

In addition, the layer of the active material particles 123 formed according to the method of manufacturing an electrode sheet proposed herein has a feature that a larger amount of the binder tends to be distributed in the surface portion C and in the bottom portion A of the layer. In other words, the binder solution 122 applied to the current collector foil 121 in the first binder supplying step 101 tends to remain in the bottom portion A of the layer. Likewise, the binder solution 122 supplied onto the layer of the active material particles 123 in the second binder supplying step 103 tends to remain in the surface portion C of the layer.

As a result, the proportion of the binder 122 tends to be greater in the bottom portion A and the surface portion C of the layer. The binder 122 remaining in the bottom portion A particularly contributes to bonding the layer of the active material particles 123 to the current collector foil 121. This layer of the active material particles 123 has a greater amount of the binder 122 in the bottom portion A of the layer, which is the boundary portion between the current collector foil 121 and the layer. Therefore, the layer and the current collector foil 121 can be firmly bonded. On the other hand, the binder 122 remaining in the surface portion C of the layer contributes to bonding the active material particles 123 within the surface portion C of the layer to each other. This layer of the active material particles 123 also has a greater amount of the binder 122 in the surface portion C of the layer, so the active material particles 123 can be prevented from being detached from the surface portion C of the layer.

For example, the method proposed herein makes it possible to provide an electrode sheet 120 in which the layer includes a ⅓ thickness region from the current collector foil 121 (i.e., the bottom portion A) and a middle ⅓ thickness region (i.e., the middle portion B), and the ⅓ thickness region contains the binder 122 in an amount at least 20% by volume greater than the middle ⅓ thickness region. Also, the method proposed herein makes it possible to provide an electrode sheet 120 in which the layer further includes a ⅓ thickness region from the surface thereof (i.e., the surface portion C), and the ⅓ thickness region from the surface contains the binder 122 in an amount at least 20% greater than the middle ⅓ thickness region (i.e., the middle portion B).

From the viewpoint of firmly bonding the current collector foil 121 and the layer to each other, it is preferable that the bottom portion A of the layer of the active material particles 123 contain the binder 122 in an amount at least 30% greater than the middle portion B. From the viewpoint of preventing the active material particles 123 from being detached from the current collector foil 121, it is preferable that the surface portion C of the layer contain the binder 122 in an amount at least 30% greater than the middle portion B.

EXAMPLE

Next, the following illustrates an example of the method of manufacturing the negative electrode sheet 60 of the lithium-ion secondary battery 10 using the above-described method.

First, a strip-shaped copper foil is prepared as the original sheet for the negative electrode current collector foil 61. A current collector foil 121 is conveyed along a predetermined conveyance passage, as illustrated in FIG. 5.

In the first binder supplying step 101, a binder solution 122 is applied onto the current collector foil 121 by direct gravure printing. The direct gravure printing herein may employ a gravure roller having intaglios in strips (a striped pattern) engraved diagonally along the direction in which the current collector foil 121 is conveyed. More specifically, the gravure roller has a plurality of intaglios engraved in the outer circumferential face diagonally relative to the rotation axis. The intaglios are oblique lines each with a depth of 20 micrometer and a width of 50 micrometer, and the gap between the intaglios is 100 micrometer. When using a gravure roller (gravure cylinder) having intaglios in strips (in a striped pattern) in this case, it is desirable that the gravure roller have a striped pattern with an appropriate width and an appropriate gap, taking the particle size of the active material particles 123 into consideration.

The binder solution 122 supplied in this step is an aqueous solution of SBR. The content of SBR contained in the binder solution 122 is set to 5 wt %. It is desirable that the content of the binder contained in the binder solution 122 supplied in the first binder supplying step 101 be adjusted according to the permeability thereof into the layer of the active material particles 123, for example. For example, it is possible that the content of the binder may be 1 wt % or higher, preferably 3 wt % or higher, and 40 wt % or lower, preferably 20 wt % or lower.

Moreover, in the second binder supplying step 102, graphite particles are used as the active material particles 123. Spheroidal graphite is used for the graphite particles. Spheroidal graphite is less likely to clog at the time of adjusting the gap, in comparison with, for example, flake graphite, so it is easy to adjust the weight per unit area of the layer. For these reasons, when forming the negative electrode active material layer 60 for the lithium-ion secondary battery 10, it is preferable to use graphite particles as the active material particles 123. It is desirable that the spheroidal graphite herein have a mean particle size (D50) of from about 20 micrometer to about 100 micrometer. Herein, spheroidal graphite having a mean particle size (D50) of about 20 micrometer is used. For the spheroidal graphite, it is preferable to use flake graphite (natural graphite) formed into spherical shape (also referred to as "spherical graphite").

Here, for the spheroidal graphite, it is preferable to employ spheroidal graphite having an aspect ratio of 2:1 to 1:1. The aspect ratio is obtained by, for example, measuring the major axis length A and the minor axis length B of each of the graphite particles from an SEM photograph of the graphite particles, to determine the ratio A/B. The ratio should desirably be determined as the mean value for 100 arbitrarily selected particles. Depending on the device used for supplying the active material particles 123 in the active material supplying step 102, it is also possible to use flake graphite, for example. When flake graphite is used, it is desirable to employ a device configuration such that a predetermined amount of active material particles 123 are sieved out and the sieved flake graphite is roughly smoothed out.

In the second binder supplying step 103 herein, it is desirable that the binder solution 122 be sprayed onto the surface of the layer of the active material particles 123 by an electrostatic spray device. In the first binder supplying step 101 and the second binder supplying step 103, it is desirable that the amount of the binder 122 necessary for forming the layer of the active material particles 123 in the electrode sheet 120 to be finally produced should be estimated, and the amount of the binder solution 122 to be supplied in each step should be determined accordingly.

For example, when the layer of the active material particles 123 to be finally produced needs to contain 0.7 wt % of the binder 122 relative to the amount of the active material particles 123, it is desirable that half the amount, 0.35 wt %, of the binder 122 should be supplied in the first binder supplying step 101, and the rest of the amount, 0.35 wt %, of the binder 122 should be supplied in the second binder supplying step 103.

The amounts of the binder solution 122 to be supplied in the first binder supplying step 101 and the second binder supplying step 103 may be adjusted as appropriate. For example, when 0.7 wt % of the binder 122 needs to be contained relative to the amount of the active material particles 123, it is possible to supply 0.40 wt % of the binder 122 in the first binder supplying step 101 and supply the remaining 0.30 wt % of the binder 122 in the second binder supplying step 103. When the amount of the binder 122 supplied in the first binder supplying step 101 is made larger, the amount of the binder in the bottom portion C of the layer of the active material particles 123 is increased, so that the layer of the active material particles 123 and the current collector foil can be bonded firmly to each other.

Next, in the drying step 104, it is desirable to adjust the temperature of the infrared rays to be applied so that, for example, the temperature of the surface of the layer of the active material particles 123 becomes about 150 deg C., for example. The temperature of the infrared rays to be applied may be adjusted as appropriate depending on the amount of the binder solution 122 to be supplied, the type of the solvent of the binder solution 122, and so forth. In the pressing step 105, it is desirable that the layer of the active material particles 123 be pressed at a required strength such that the active material particles 123 in the layer of the active material particles 123 are firmly bonded to each other and also the active material particles 123 are firmly bonded to the current collector foil 121.

The above-described method makes it possible to obtain the negative electrode sheet 60 (see FIG. 1) for the lithium-ion secondary battery 10, in which the active material particles 123 are graphite particles, the binder 122 is an SBR, and the layer of the active material particles 123 contains no thickening agent such as contained in the mixture paste (such as CMC). Using the above-described negative electrode sheet 60 in manufacturing a lithium-ion secondary battery 10 makes it possible to obtain a low-resistance battery because no thickening agent (CMC) is present in the negative electrode active material layer 63. Conventionally, when a mixture paste is coated, it has been observed that the binder 122 is distributed unevenly because of the migration during the drying step. However, the above-described method can prevent such a problem. As a result, the amount of the binder 122 used can be kept low.

FIG. 8 is a graph comparing the I-V resistance at a low temperature between a battery X (non-proposed battery) and a battery Y (proposed battery). Here, the battery X is a battery having a negative electrode sheet 60 in which the negative electrode active material layer 63 is formed by applying a mixture paste, as is conventional. The battery Y is a battery having a negative electrode sheet 60 in which the negative electrode active material layer 63 is formed through the first binder supplying step 101, the active material supplying step 102, the second binder supplying step 103, the drying step 104, and the pressing step 105, which are described above. The battery X contains 0.7 wt % of CMC relative to the amount of graphite particles, the negative electrode active material, in the negative electrode active material layer 63. The battery Y contains no CMC. The amount of the graphite particles as the negative electrode active material and the amount of the binder relative to the graphite particles were set to be the same in weight ratio. In addition, the batteries X and Y have the same configuration except for the negative electrode active material layer 63.

Herein, the I-V resistance was compared in a temperature environment of minus 10 deg C. and in a condition of 30% SOC. More specifically, the I-V resistance is a resistance value obtained from the gradient of a primary approximate line of the current (I)-voltage (V) plots for the above-described batteries that were adjusted to 30% SOC with a rate of 1 C and thereafter subjected to CC discharge at a rate of 10 C for 10 seconds under a temperature environment of minus 10 deg C. Herein, SOC refers to the state of charge of the battery, which is defined as the state of charge of the battery when 0% SOC is set at 3.0 V and 100% SOC is set at 4.1 V in this embodiment. It is desirable that the I-V resistance should be measured after the test batteries were subjected to a conditioning process. As a result, it is demonstrated that, as illustrated in FIG. 8, the battery Y, which has the negative electrode sheet 60 in which the negative electrode active material layer 63 is formed by the method proposed herein, tends to show a lower I-V resistance than the battery X, which has the negative electrode sheet 60 in which the negative electrode active material layer 63 is formed by applying a mixture paste.

It has been described herein that, as an example, the invention is applied to the negative electrode sheet 60. However, the applicable negative electrode sheet 60 herein is not limited to the one as described above. For example, the active material particles of the negative electrode active material layer 63 are not limited to graphite particles, but various other types of particles may be used. Moreover, the binder 122 is not limited to SBR. The above-described method of manufacturing an electrode sheet can also be applicable to, for example, manufacture of the positive electrode sheet 50 for the lithium-ion secondary battery 10. In this case, for the active material particles 123 supplied in the active material supplying step 102, particles of a lithium-transition metal oxide may be used as the positive electrode active material. In this case, in the active material supplying step, it is preferable that mixed particles containing a conductive agent for ensuring electrical conductivity be supplied as the active material particles 123. Thus, the active material particles 123 supplied in the active material supplying step 102 may be the mixed particles comprising the active material particles 123 containing a conductive agent, as appropriate.

For the binder 122, it is possible to employ any binder that is appropriate as the binder for the positive electrode active material layer 53. The binder solution 122 is not limited to an aqueous solution. For example, N-methyl-2-pyrrolidone (NMP) may be used for the solvent of the binder solution 122. Polyvinylidene difluoride (PVDF) may be used for the binder 122.

Furthermore, although the lithium-ion secondary battery 10 has been illustrated as an example, the invention may be applied to the manufacture of various types of batteries having an electrode sheet, as illustrated in FIG. 7, including a current collector foil 121 and a layer disposed on the current collector foil 121 and comprising active material particles 123 and a binder 122, the active material particles 123 bonded to each other and to the current collector foil 121 by the binder 122. Therefore, the invention may be widely applicable to a method of manufacturing a non-aqueous electrolyte secondary battery provided with such an electrode sheet.

As has been described above, a method of manufacturing a non-aqueous electrolyte secondary battery proposed herein includes, as illustrated in FIG. 5, a first binder supplying step 101, an active material supplying step 102, a second binder supplying step 103, and a pressing step 105. The first binder supplying step 101 is a step of applying a binder solution 122 to a current collector foil 121. The active material supplying step 102 is a step of supplying active material particles 123 onto the current collector foil 121 to which the binder solution 122 has been applied. The second binder supplying step 103 is a step of applying the binder solution 122 onto the active material particles 123. The pressing step 105 is a step of pressing a layer of the active material particles 123 on the current collector foil 121.

In the method proposed herein, the layer of the active material particles 123 contains no additive agent, such as a thickening agent, that is required for preparing a mixture paste. This makes it possible to obtain an electrode with lower resistance, compared to the cases that the layer of the active material particles is prepared by applying a mixture paste. It is also possible to provide a non-aqueous electrolyte secondary battery with lower resistance. Moreover, since the need for preparing the mixture paste is eliminated, the time required for the manufacture can be shortened, and the manufacturing cost can be further lowered.

Herein, as described above, it is possible that in the first binder supplying step, the binder solution may be supplied onto a surface of the current collector foil by gravure printing or ink-jet printing. This enables a required binder solution 122 to be applied to the surface of the current collector foil in a predetermined pattern. It is also possible that the binder solution may be an aqueous solution. It is also possible that a binder contained in the binder solution may be an SBR. It is also possible that the current collector foil may be a copper foil, and the active material particles may be graphite particles. In this case, the graphite particles may comprise spheroidal graphite. It is also possible that the method may further comprise a drying step of drying the current collector foil after the second binder supplying step and before the pressing step. In this case, the drying step may comprise applying infrared rays to the current collector foil on which the binder solution and the active material particles have been supplied.

An electrode sheet proposed herein includes a current collector foil and a layer disposed on the current collector foil and comprising active material particles and a binder. The active material particles are bonded to each other and to the current collector foil by the binder. The layer contains no thickening agent. That is, it is possible to provide an electrode sheet in which the layer of active material particles contains no thickening agent. Such an electrode sheet shows low resistance because it contains no thickening agent, so it contributes to providing a low-resistance non-aqueous electrolyte secondary battery.

Herein, it is also possible that in the electrode sheet, the layer includes a ⅓ thickness region from the current collector foil and a middle ⅓ thickness region, and the ⅓ thickness region from the current collector foil contains the binder in an amount at least 20% by volume greater than the middle ⅓ thickness region. In this case, the bottom portion of the layer of active material particles, i.e., the boundary portion between the current collector foil and the layer of active material particles, contains the binder in a greater amount, which results in higher bonding strength between the current collector foil and the layer of active material particles. It is also possible that the layer further includes a ⅓ thickness region from a surface of the layer, and the layer contains the binder in an amount at least 20% greater than the middle ⅓ thickness region. This prevents the active material particles from being detached from the surface of the layer.

It is also possible to provide an electrode sheet in which the active material particles are graphite particles, the binder is an SBR, and the layer contains no CMC. Such an electrode sheet is suitable for, for example, a negative electrode sheet for a lithium-ion secondary battery.

Although the present invention has been described in detail hereinabove, it should be understood that the foregoing embodiments are merely exemplary of the invention, and various modifications and alterations of the above-described examples are within the scope of the invention disclosed herein.

For example, in the foregoing embodiment, the drying step 104 is provided after the second binder supplying step 103 and before the pressing step 102. It should be noted, however, that if the layer of the active material particles 123 does not stick to the press rollers 105*a* and 105*b* in the pressing process 105, the drying step 104 may be eliminated.

In the foregoing embodiments, a lithium-ion secondary battery has been taken as an example of the non-aqueous electrolyte secondary battery. However, the non-aqueous electrolyte secondary battery to which the present invention can be applied is not limited to the lithium-ion secondary battery. The non-aqueous electrolyte secondary battery (typically the lithium ion secondary battery) disclosed herein may be applicable to various applications, and it shows particularly low-resistance and high battery performance. Therefore, the non-aqueous electrolyte secondary battery proposed herein can be used suitably for the applications that require high energy density and high power density. An example of such applications is a power source (driving power source) for electric motors incorporated in vehicles. The types of the vehicles are not particularly limited, and examples include plug-in hybrid vehicles (PHVs), hybrid vehicles (HVs), electric cargo vehicles, small-sized motorcycles, power assisted bicycles, electric powered wheelchairs, and electric railroads. The non-aqueous electrolyte secondary battery may be used in the form of a battery module, in which a plurality of the batteries are connected in series and/or in parallel to each other.

For example, the non-aqueous electrolyte secondary battery proposed herein is especially suitable for a vehicle drive battery 1000 incorporated in a vehicle 1, as illustrated in FIG. 9. Here, the vehicle drive battery 1000 may be in the form of battery module in which a plurality of the non-aqueous electrolyte secondary batteries (typically, lithium-ion secondary batteries) as described above are connected in series. Typical examples of the vehicle 1, which has such a vehicle drive battery 1000 as its electric power source, include automobiles, particularly automobiles having an electric motor, such as hybrid vehicles (including plug-in hybrid vehicles) and electric vehicles. It should also be noted that a sodium ion secondary battery, for example, may be employed as other type of non-aqueous electrolyte secondary battery.

REFERENCE SIGNS LIST

10—Lithium-ion secondary battery (Secondary battery)
20—Battery case
21—Case main body
22—Sealing plate
23—Positive electrode terminal
24—Negative electrode terminal
30—Safety vent
32—Filling port
33—Sealing material
40—Wound electrode assembly (electrode assembly)
50—Positive electrode sheet
51—Positive electrode current collector foil
52—Exposed portion (Positive electrode current collector foil-exposed portion)
53—Positive electrode active material layer
60—Negative electrode sheet
61—Negative electrode current collector foil
62—Exposed portion (Negative electrode current collector foil-exposed portion)
63—Negative electrode active material layer
72, 74—Separator
80—Electrolyte solution
90—Charger
92—Switch
94—Resistor
101—Binder supplying step
101*a*—Gravure roller
102—Active material supplying step
102*a*—Hopper
102*b*—Gap adjusting mechanism
103—Binder supplying step
103*a*—Spray device
104—Drying step
104*a*—Dryer device
105—Pressing step 105a, 105b—Press roller
120—Electrode sheet
121—Current collector foil
122—Binder, binder solution
123—Active material particle
1000—Vehicle drive battery (battery module)
A—Bottom portion of layer of active material particles 123
B—Middle portion of layer of active material particles 123
C—Surface portion of layer of active material particles 123
WL—Winding axis

The invention claimed is:

1. A method of manufacturing a non-aqueous electrolyte secondary battery, comprising:
   a first binder supplying step of applying a binder solution to a current collector foil;
   an active material supplying step of supplying active material particles onto the current collector foil to which the binder solution has been applied;
   a second binder supplying step of supplying a binder solution onto the active material particles; and
   a pressing step of pressing a layer of the active material particles on the current collector foil.

2. The method according to claim 1, wherein, in the first binder supplying step, the binder solution is supplied onto a surface of the current collector foil by gravure printing or ink-jet printing.

3. The method according to claim 1, wherein the binder solution is an aqueous solution.

4. The method according to claim 1, wherein a binder contained in the binder solution is an SBR.

5. The method according to claim 1, wherein the current collector foil is a copper foil, and the active material particles are graphite particles.

6. The method according to claim 5, wherein the graphite particles comprise spheroidal graphite.

7. The method according to claim 1, further comprising, after the second binder supplying step and before the pressing step, a drying step of drying the current collector foil.

8. The method according to claim 7, wherein the drying step comprises applying infrared rays to the current collector foil to which the binder solution and the active material particles have been supplied.

9. An electrode sheet comprising:
   a current collector foil; and
   a layer disposed on the current collector foil and comprising styrene-butadiene copolymer and active material particles only, the active material particles bonded to each other and to the current collector foil by the styrene-butadiene copolymer, and
   wherein the layer includes a ⅓ thickness region from the current collector foil and a middle ⅓ thickness region, and the ⅓ thickness region from the current collector foil contains the binder in an amount at least 20% by volume greater than the middle ⅓ thickness region.

10. The electrode sheet according to claim 9, wherein the layer further includes a ⅓ thickness region from a surface of the layer, and the ⅓ thickness region from the surface contains the binder in an amount at least 20% by volume greater than the middle ⅓ thickness region of the layer.

* * * * *